US009758172B2

(12) United States Patent
Naito et al.

(10) Patent No.: US 9,758,172 B2
(45) Date of Patent: Sep. 12, 2017

(54) STATUS DETERMINATION APPARATUS

(71) Applicant: DENSO CORPORATION, Kariya, Aichi-pref (JP)

(72) Inventors: Takahiro Naito, Nukata-gun (JP); Katsuyoshi Nishii, Okazaki (JP); Yoshinori Watanabe, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/796,300

(22) Filed: Jul. 10, 2015

(65) Prior Publication Data
US 2016/0016589 A1 Jan. 21, 2016

(30) Foreign Application Priority Data

Jul. 15, 2014 (JP) ................................. 2014-145318

(51) Int. Cl.
G01C 22/00 (2006.01)
G05D 1/00 (2006.01)
B60W 40/08 (2012.01)
B60W 50/12 (2012.01)

(52) U.S. Cl.
CPC ............ B60W 40/08 (2013.01); B60W 50/12 (2013.01); *B60W 2040/0818* (2013.01)

(58) Field of Classification Search
CPC .............. B60W 2040/0818; B60W 2040/0827
See application file for complete search history.

(56) References Cited

U.S. PATENT DOCUMENTS

| 2009/0048737 | A1* | 2/2009 | Nakagoshi | ............ | B60W 40/08 |
| | | | | | 701/43 |
| 2010/0033333 | A1* | 2/2010 | Victor | .................... | A61B 3/113 |
| | | | | | 340/576 |
| 2014/0091916 | A1* | 4/2014 | Aoki | ....................... | G08B 21/06 |
| | | | | | 340/435 |

(Continued)

FOREIGN PATENT DOCUMENTS

| JP | 2004-168202 A | 6/2004 |
| JP | 2009-145951 A | 7/2009 |

(Continued)

*Primary Examiner* — Imran Mustafa
(74) *Attorney, Agent, or Firm* — Posz Law Group, PLC

(57) ABSTRACT

A status determination apparatus determining a driver status in a movable body is provided. The status determination apparatus includes a behavior acquisition portion, a check portion, a determination portion, and a range change portion. The behavior acquisition portion obtains behavior information as present behavior information. The behavior information represents behavior of the movable body. The check portion collates the present behavior information with a threshold region representing a range of the behavior information at time when a driver drives absentmindedly. When the threshold region includes the present behavior information, the determination portion determines that the driver drives absentmindedly. The range change portion changes the threshold region. When the range change portion changes the threshold region, the driver is not determined that the driver drives absentmindedly when a driving support control is executed, and the check portion collates the present behavior information with the changed threshold region.

15 Claims, 4 Drawing Sheets

(56) References Cited

U.S. PATENT DOCUMENTS

2015/0039186 A1* 2/2015 Okuda ................ B60W 50/14
  701/41

FOREIGN PATENT DOCUMENTS

| JP | 2009-157606 A | 7/2009 |
| JP | 2010-173601 A | 8/2010 |
| JP | 2011-216058 A | 10/2011 |
| JP | 2013-140508 A | 7/2013 |

* cited by examiner

FIG. 2A

| CLASS 1 | | SPECIFIC SHORT TIME | 1ST TIME | | |
|---|---|---|---|---|---|
| | | x1 [sec] | x2 [min] | | |
| JERK AAV | LOWER LIMIT | 0.436 | 0.696 | | |
| | UPPER LIMIT | 0.916 | 0.827 | | |
| STEER ANGLE CHANGE AAV | LOWER LIMIT | 0 | 0 | 0 | |
| | UPPER LIMIT | 1.02 | 0.775 | 8 | |
| STEER ANGLE JERK AAV | LOWER LIMIT | 0 | 0 | 2 | 0 |
| | UPPER LIMIT | 11.4 | 9.18 | 3 | 0.667 |
| STEER ANGLE JERK AAV | LOWER LIMIT | 7.68 | 13.8 | | 0.718 |
| | UPPER LIMIT | 25.3 | 17.4 | | 0.983 |
| STEER ANGLE JERK AAV | LOWER LIMIT | 2.4 | | | 8.96 |
| | UPPER LIMIT | 14.5 | | | 11.1 |

FIG. 2B

| CLASS 1 | | SPECIFIC SHORT TIME | 2ND TIME | | |
|---|---|---|---|---|---|
| | | x1 [sec] | x3 [min] | | |
| JERK AAV | LOWER LIMIT | 0.501 | 0.808 | | |
| | UPPER LIMIT | 0.665 | 0.874 | | |
| STEER ANGLE CHANGE AAV | LOWER LIMIT | 0 | 0 | 0 | |
| | UPPER LIMIT | 0.51 | 0.725 | 5 | |
| STEER ANGLE JERK AAV | LOWER LIMIT | 0 | 0 | 9 | 0.585 |
| | UPPER LIMIT | 6.6 | 8.91 | 8 | 0.614 |
| STEER ANGLE JERK AAV | LOWER LIMIT | 0 | 2.55 | | 0 |
| | UPPER LIMIT | 2.88 | 4.35 | | 1.25 |
| STEER ANGLE JERK AAV | LOWER LIMIT | 0 | | | 0 |
| | UPPER LIMIT | 10.8 | | | 13.7 |

STATUS DETERMINATION APPARATUS

CROSS REFERENCE TO RELATED APPLICATION

This application is based on Japanese Patent Application No. 2014-145318 filed on Jul. 15, 2014, the disclosure of which is incorporated herein by reference.

TECHNICAL FIELD

The present disclosure relates to a technology determining a driver status in a movable body.

BACKGROUND ART

Patent literature 1: JP 2013-140508A

Conventionally, a status determination apparatus is mounted to a vehicle and determines a driver status in a vehicle (referring to patent literature 1).

The status determination apparatus described in patent literature 1 compares a speed variation of a vehicle per unit time and a variation of a steering angle per unit time with predetermined thresholds. As a result of the comparison, when the speed variation and the variation of the steering angle are less than the thresholds, it is considered that the driver in a movable body drives absentmindedly.

The inventors of the present disclosure have found the following.

When a driving support control to support driving of a vehicle is in execution, a speed variation per unit time and a steering angle variation per unit time in the vehicle may be reduced.

The status determination apparatus in the patent literature 1 may cause an erroneous determination that the driver drives absentmindedly, regardless of a case where the driver does not drive absentmindedly. A determination accuracy of the driver status in a conventional technology may not be sufficiently high.

SUMMARY

It is an object of the present disclosure to improve a determination accuracy in a technology that determines a driver status in a movable body.

According to one aspect of the present disclosure, a status determination apparatus determining a driver status in a movable body is provided. The status determination apparatus includes a behavior acquisition portion, a check portion, a determination portion, and a range change portion. The behavior acquisition portion obtains behavior information as present behavior information. The behavior information represents behavior of the movable body. The check portion collates the present behavior information with at least one threshold region representing a range of the behavior information at time when a driver in the movable body drives absentmindedly and checks whether the at least one threshold region includes the present behavior information. The determination portion determines, when the threshold region includes the present behavior information as a result of collation by the checking portion, that the driver in the movable body drives absentmindedly. The range change portion changes the threshold region. When the range change portion changes the threshold region, the driver in the movable body is prevented from being determined to be driving absentmindedly when a driving support control that supports driving of the movable body is executed in comparison with a case where the driving support control is not executed, and the check portion collates the present behavior information with the threshold region changed by the range change portion.

According to the status determination apparatus, when the driving support control is executed in the movable body, it is possible to be less likely determined that the driver in the movable body drives absentmindedly. When the driving support control is in execution in the movable body, it is possible to reduce an erroneous determination that a driver drives absentmindedly, regardless of a case where the driver does not drive absentmindedly. It may be possible to improve a determination accuracy of a driver status.

BRIEF DESCRIPTION OF THE DRAWINGS

The above and other objects, features and advantages of the present disclosure will become more apparent from the following detailed description made with reference to the accompanying drawings. In the drawings:

FIG. 1 is a block diagram schematically illustrating a status determination system having a status determination ECU that the present disclosure is used in;

FIG. 2A is a diagram illustrating an example of a first determination model used for the status determination of a driver;

FIG. 2B is a diagram illustrating an example of a second determination model used for the status determination of a driver;

DETAILED DESCRIPTION

Figure 1:
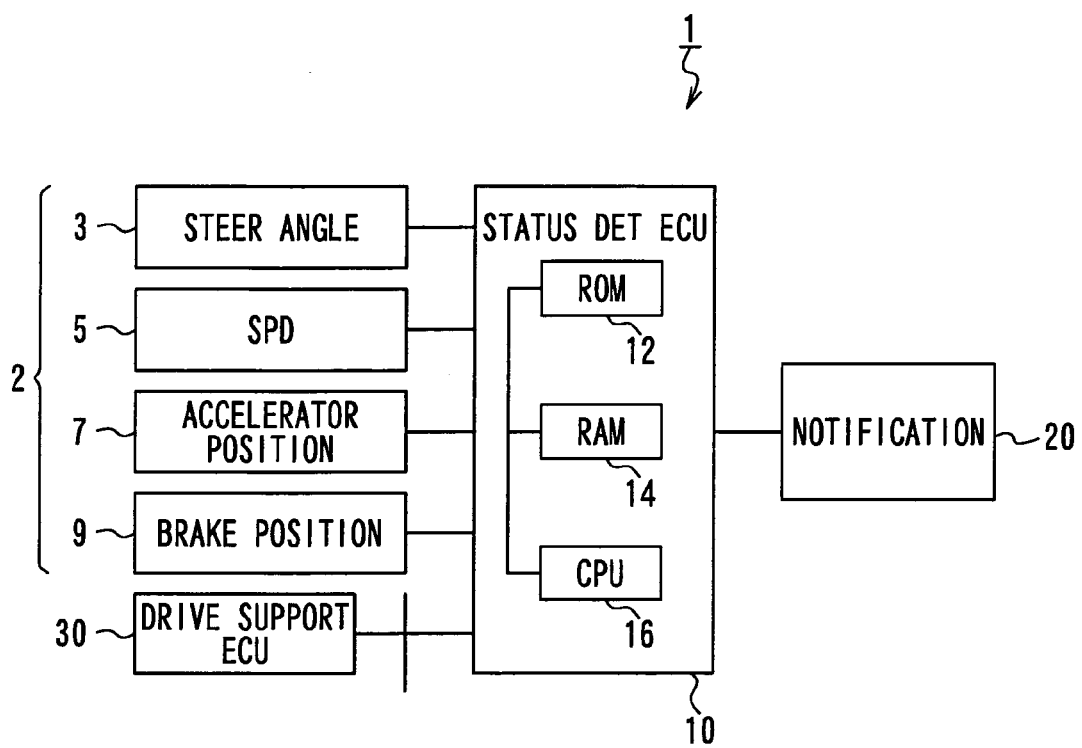

Embodiments of the present disclosure will be explained with referring to the drawings.

(Status Determination System)

A status determination system 1 illustrated in FIG. 1 is mounted to a vehicle, and determines a driver status in the vehicle.

The driver status includes a status where a driver drives a vehicle absentmindedly. The status where the driver drives the vehicle absentmindedly may be referred to as an absent-minded status. The status where the driver drives the vehicle absentmindedly may also be referred to as a status where the driver drives inattentively. The status determination system 1 has a sensor group 2, a status determination electronic control apparatus 10, a notification device 20, and a driving support electronic control apparatus 30. Incidentally, the status determination electronic control apparatus may be referred to as a status determination Electronic Control Unit (ECU). The driving support electronic control apparatus may be referred to as a driving support ECU.

The sensor group 2 includes multiple sensors detecting a driver status in a subject vehicle. The sensor group 2 at least includes a steer angle sensor 3, a vehicle speed sensor 5, an accelerator position sensor 7, and a brake position sensor 9.

The steer angle sensor 3 is a known sensor measuring an angle of a steering of the subject vehicle. The speed sensor 5 is a known sensor measuring a rotational speed of each wheel of the subject vehicle. Incidentally, in the present embodiment, an average value of the rotational speed of a wheel measured by the vehicle speed sensor 5 may be measured as a travelling speed (a vehicle speed) in the subject vehicle.

The accelerator position sensor 7 is a known sensor detecting the pressing amount of an accelerator pedal of the subject vehicle. The brake position sensor 9 is a known sensor detecting the pressing amount of a brake pedal of the subject vehicle.

An informing device 20 is a known device notifying information according to a control signal from the status determination ECU 10. The informing device 20 includes at least one of a display device displaying information and a sound output device outputting information with sound for example. The display device includes, for example, a display, and an indication light (a warning light).

The driving support ECU 30 is an electronic control apparatus executing a driving support control. The driving support control supports a driver in order to improve traveling safety of a vehicle.

The driving support control includes, for example, an adaptive cruise control (ACC), and a lane keeping assistance (LKA). The ACC is a known control that maintains a distance between a precedence vehicle and the subject vehicle in a suitable distance. The LKA is a known control that recognizes a traffic lane shape of a running road which the subject vehicle runs and controls a steering so that the subject vehicle does not deviate from the traffic lane of the running road.

The driving support ECU 30 that performs the driving support control is configured from a known microcomputer having at least a ROM, a RAM, and a CPU.

The driving support ECU 30 is connected with a not-shown vehicular control apparatus, a not-shown vehicular apparatus, and a not-shown periphery monitoring apparatus. The vehicular control apparatus at least includes a brake control apparatus, an engine control apparatus, and a steering mechanism. The vehicular apparatus at least includes a warning buzzer, a monitor, a cruise control switch, a target vehicle distance configuration switch, or the like. The periphery monitoring apparatus is an apparatus monitoring a status around a vehicle, and includes a radar apparatus and a camera, for example. The periphery monitoring apparatus outputs target object information, and a traffic lane shape of the running road of the subject vehicle, for example. The target object information represents a position of a target object existing around the subject vehicle. The periphery monitoring apparatus detects the traffic lane shape of the running road.

The brake control apparatus controls braking force applied to the subject vehicle, according to a brake condition based on a target acceleration and a brake request from the driving support ECU 30. The engine control apparatus controls driving force in an internal combustion engine and a drive system, according to a driving status based on the target acceleration and a fuel cut request from the driving support ECU 30. The steering mechanism controls a steering according to a steering angle from the driving support ECU 30.

The driving support ECU 30 controls the vehicular control apparatus and the vehicular apparatus, based on the target object information and the traffic lane shape from the periphery monitoring apparatus, to provide a driving support control.

Furthermore, while performing the driving support control, the driving support ECU 30 outputs an execution signal to the status determination ECU 10. The execution signal illustrates that the driving support control is in execution.

(Status Determination ECU)

The status determination ECU 10 includes a known microcomputer having at least a ROM 12, a RAM 14, and a CPU 16. The ROM 12 stores a processing program and data, which need to hold memory content even when a power is disconnected. The RAM 14 stores a processing program and data temporarily. The CPU 16 executes various processing according to the processing program stored in the ROM 12 and the RAM 14.

The ROM 12 in the status determination ECU 10 stores a processing program used when the status determination ECU 10 executes the status determination processing. In the status determination processing, the status determination ECU 10 determines a driver status in the subject vehicle.

The ROM 12 in the status determination ECU 10 stores a determination model used in the status determination processing.

(Determination Model)

The determination model will be explained.

The determination model shows vehicle behavior at the time when a driver drives the vehicle absentmindedly (for example, inattentively). The determination model is determined based on results such as an experiment in advance.

The determination model includes a first determination model and a second determination model. The first determination model determines vehicle behavior at the time the vehicle is in a steady travelling and the driver drives absentmindedly. The second determination model determines vehicle behavior at the time the driver drives absentmindedly and the vehicle transits to the steady travelling.

As described in FIG. 2A, the first determination model determines a threshold region for each class showing a kind of property common to drivers. The threshold region is a range of behavior information that shows the behavior of the vehicle when the driver drives absentmindedly. The threshold region determined in each class in the first determination model is determined in advance, and at least a part of a threshold region is not overlapped with another threshold region. Incidentally, the number of classes of the first determination model is two or more, for example, is equal to 7.

The threshold region in the first determination model is determined by a short-term jerk region, a long-term jerk region, a short-term steering angle change region, a long-term steering angle change region, a short-term steering angle jerk region, and a long-term steering angle jerk region.

The short-term jerk region and the long-term jerk region in the first determination model are ranges of thresholds that have a jerk average absolute value as the behavior information.

The short-term jerk region in the first determination model is a range from a lower limit to an upper limit of the jerk average absolute value that appears during a specific short time in a case where the vehicle drives in the steady travelling and the driver drives absentmindedly. The specific short time is a time length that is considered as a short time. For example, the specific short time may be several tens of seconds (for example, 50 seconds).

The long-term jerk region in the first determination model is a range from a lower limit to an upper limit of the jerk average absolute value that appears in a first time in a case where the vehicle drives in the steady travelling and the driver drives absentmindedly. The first time is a time length that is considered a vehicle is in the steady travelling. The first time is longer than the specific time. For example, the first time may be about ten minutes (for example, 15 minutes).

In the present embodiment, the upper limits of the jerk average absolute values in the short-term jerk region and the long-term jerk region in the first determination model are changeable. Specifically, it is defined that the upper limit of the jerk average absolute value is selectable from a maximum value of the upper limit, a standard value of the upper limit, and a minimum value of the upper limit. The standard value is smaller than the maximum value of the upper limit. The minimum value is smaller than the standard value of the upper limit.

The short-term steering angle change region and the long-term steering angle change region in the first determination model are ranges of thresholds that have a steering angle change average absolute value as the behavior information.

The short-term steering angle change region in the first determination model is a range from a lower limit to an upper limit of the steering angle change average absolute value that appears in the specific short time when the vehicle is driven in the steady travelling and the driver drives absentmindedly. The long-term steering angle change region in the first determination model is a range from a lower limit to an upper limit of the steering angle change average absolute value that appears in the first time when the vehicle is driven in the steady travelling and the driver drives absentmindedly.

In the present embodiment, the upper limits of the steering angle average absolute values in the short-term steering angle change region and the long-term steering angle change region in the first determination model are changeable. Specifically, it is defined that the upper limit of the steering angle change average absolute value in the first determination model may be selected from a maximum value of the upper limit, a standard value of the upper limit, and a minimum value of the upper limit. The standard value is smaller than the maximum value of the upper limit. The minimum value is smaller than the standard value of the upper limit.

The short-term steering angle jerk region and the long-term steering angle jerk region in the first determination model are ranges of thresholds that have a steering angle jerk average absolute value as the behavior information.

The short-term steering angle jerk region in the first determination model is a range from a lower limit to an upper limit of the steering angle jerk average absolute value that appears in the specific short time in a case where the vehicle drives in the steady travelling and the driver drives absentmindedly. The long-term steering angle jerk region in the first determination model is a range from a lower limit to an upper limit of the steering angle jerk average absolute value that appears in the first time in a case where the vehicle drives in the steady travelling and the driver drives absentmindedly.

The upper limits of the steering angle jerk average absolute values in the short-term steering angle jerk region and the long-term steering angle jerk region in the first determination model are changeable. Specifically, it is defined that the upper limit of the steering angle jerk average absolute value is selected from a maximum value of the upper limit, a standard value of the upper limit, and a minimum value of the upper limit. The standard value is smaller than the maximum value of the upper limit. The minimum value is smaller than the standard value of the upper limit.

As described in FIG. 2B, the second determination model determines a threshold region of each class showing a kind of property common to drivers. The threshold region is a range of behavior information that represents the vehicle behavior when the driver drives absentmindedly. The threshold region defined in each class in the second determination model is determined so that at least a part of a threshold region is not overlapped with another threshold region. Incidentally, the number of classes of the second determination model is two or more, for example, is equal to 6.

The threshold region in the second determination model is determined by a short-term jerk region, a long-term jerk region, a short-term steering angle change region, a long-term steering angle change region, a short-term steering angle jerk region, and a long-term steering angle jerk region.

The short-term jerk region, the short-term steering angle change region, and the short-term steering angle jerk region are ranges of the behavior information that appears in the specific short time in a case where the vehicle is transited to the steady status and the driver drives absentmindedly. The short-term jerk region, the short-term steering angle change region, and the short-term steering angle jerk region in the second determination model are similar to the short-term jerk region, the short-term steering angle change region, and the short-term steering angle jerk region in the first determination model except for a point that the time length for determining each of the threshold regions is a second time. Thus, an detailed explanation of the short-term jerk region, the short-term steering angle change region, and the short-term steering angle jerk region in the second determination model will be omitted.

The long-term jerk region, the long-term steering angle change region, and the long-term steering angle jerk region are ranges of the behavior information that appears in the second time in a case where the vehicle is transited to the steady status and the driver drives absentmindedly. The long-term jerk region, the long-term steering angle change region, and the long-term steering angle jerk region in the second determination model are similar to the long-term jerk region, the long-term steering angle change region, and the long-term steering angle jerk region in the first determination model except for a point that the time length for determining each of the threshold regions is the second time. Thus, a detailed explanation of the long-term jerk region, the long-term steering angle change region, and the long-term steering angle jerk region in the second determination model will be omitted.

The second time is a time length that is considered that a vehicle is transited to the steady travelling. The second time is longer than the specific short time and shorter than the first time. For example, the second time may be about minutes (for example, 8 minutes).

Incidentally, the jerk average absolute value is an arithmetical mean of absolute values of a jerk (namely, an added acceleration) of a vehicle. The added acceleration is a change rate of acceleration per unit time. The added acceleration (the jerk) may be calculated by twice time differentiation of a vehicle speed.

The steering angle change average absolute value is an arithmetic mean of change of the steering angle of the vehicle per unit time. The steering angle jerk average absolute value is an arithmetical mean of absolute values of a jerk of a steer angle of the vehicle. The jerk of the steer angle is a change rate of the steer angle per unit time. The jerk of the steering angle may be calculated by three-time time differentiation of the steer angle.

A generation method of the determination model will be explained.

In a generation of the first determination model, multiple drivers drive a vehicle, initially. The jerk average absolute value, the steering angle change average absolute value, and the steering angle jerk average absolute value at the time when a vehicle speed is faster than a predetermined speed (for example, 50 km/h) or more for the first time (that is, 15 minutes) or more and a driver drives absentmindedly are calculated. Then, the jerk average absolute values, the steering angle change average absolute values, and the steering angle jerk average absolute values are clustered. According to the clustering, the long-term jerk region, the long-term steering angle change region, and the long-term steering angle jerk region in each class in the first determination model are calculated. In the generation of the first determination model, for example, a k-means clustering may be used for clustering.

Incidentally, the number of "k" in clusters is equal to the number of clusters (in this embodiment, 7) in the first determination model.

In the generation of the first determination model, the jerk average absolute values, the steering angle change average absolute values, and the steering angle jerk average absolute values in the specific short time are clustered. According to the clustering, the short-term jerk region, the short-term steering angle change region, and the short-term steering angle jerk region in each class in the first determination model are calculated.

In the generation of the first determination model, the long-term jerk region, the long-term steering angle change region, the long-term steering angle jerk region, the short-term jerk region, the short-term steering angle change region, and the short-term steering angle jerk region are associated with each other in each class. Accordingly, the first determination model in which the threshold region is determined in each class is generated. The threshold region in each class in the first determination model is determined so that a percentage of a correct answer determined by a known evaluation method in the clustering is equal to a predetermined first standard value or more. The percentage of correct answers is a product of sensitivity and a specific value.

For example, the sensitivity may correspond to a ratio that it is determined as an absentminded status when the driver feels the absentminded status. The specific value may correspond to a ratio that it is not determined as the absentminded status when the driver does not feel the absentminded status.

In the generation of the second determination model, multiple drivers drive a vehicle initially. The jerk average absolute value, the steering angle change average absolute value, and the steering angle jerk average absolute value at the time when the vehicle speed is equal to or more than the predetermined speed (for example, 50 km/h) for the second time (that is, 8 minutes) or more are calculated. The jerk average absolute values, the steering angle change average absolute values, and the steering angle jerk average absolute values are clustered. According to the clustering, the long-term jerk region, the long-term steering angle change region, and the long-term steering angle jerk region in each class in the second determination model are calculated. In order to generate the second determination model, for example, a k-means clustering may be used for clustering.

Incidentally, the number of "k" of clusters is equal to the number of clusters (in this embodiment, 6) in the second determination model.

In the generation of the second determination model, the jerk average absolute values, the steering angle change average absolute values, and the steering angle jerk average absolute values in the specific short time are clustered. According to the clustering, the short-term jerk region, the short-term steering angle change region, and the short-term steering angle jerk region in each class of the second determination model are calculated.

In the generation of the second determination model, the long-term jerk region, the long-term steering angle change region, the long-term steering angle jerk region, the short-term jerk region, the short-term steering angle change region, and the short-term steering angle jerk region are associated with each other in each class. Accordingly, the second determination model in which the threshold region is determined in each class is generated. The threshold region in each class in the second determination model is determined so that a percentage of a correct answer determined by a known evaluation method in the clustering is equal to or more than a predetermined second standard value. The percentage of a correct answer is a product of sensitivity and a specific value.

The first determination model and the second determination model have a range of behavior information (that is, a threshold region) when a driver drives a movable body absentmindedly. The threshold region in the first determination model and the second determination model is determined by clustering. Two or more threshold regions of the first determination model are determined for each property of a driver, and at least a part of the threshold region is not overlapped with another threshold region. At least two or more threshold regions of the second determination model are determined for each property of a driver, and, at least a part of the threshold regions is not overlapped with another threshold region.

(Status Determination Processing)

The status determination processing executed by the status determination ECU 10 will be explained.

The status determination processing starts up when a startup command is input. To input of the startup command may be a case where an ignition switch turns on.

Figure 3:
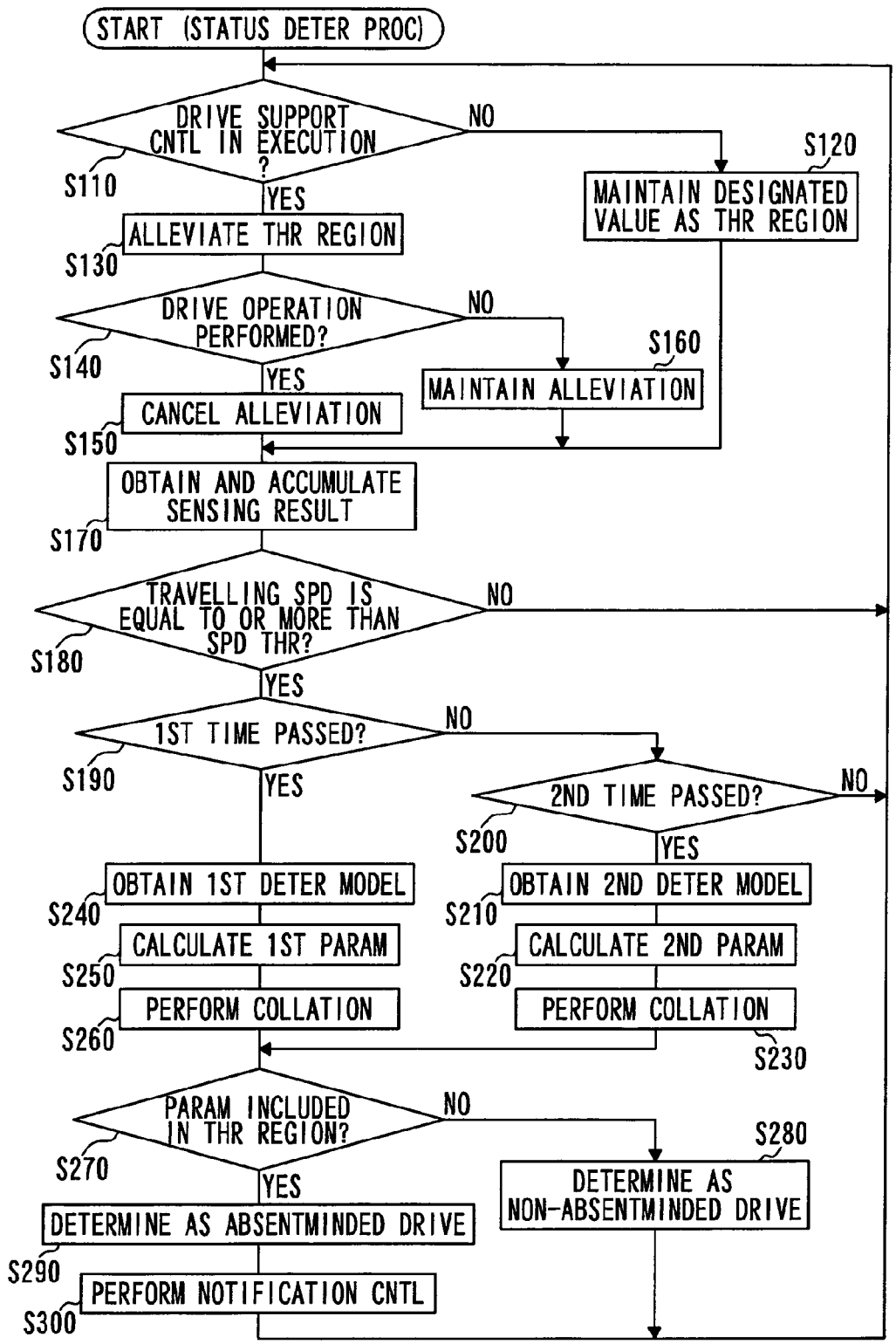
FIG. 3 is a diagram illustrating a processing of the status determination processing.

When the status determination processing starts up, as described in FIG. 3, the status determination ECU 10 determines at S110 whether the driving support ECU 30 is executing the driving support control. At S110, when the status determination ECU 10 receives an execution signal from the driving support ECU 30, the status determination ECU 10 determines that the driving support control is in execution.

When it is determined that the driving support control is not in execution as a result of determination at S110 (S110: NO), the status determination ECU 10 sets (or maintains) the upper limit of the threshold region in the first determination model and the second determination model to an upper limit designated by a user (S120). The status determination ECU 10 shifts the status determination processing to S170.

When it is determined that the driving support control is in execution as the result of the status determination at S110 (S110: YES), the status determination ECU 10 changes the upper limits of the threshold value in the first determination model and the second determination model, so that it becomes less likely determined that the driver drives absentmindedly (S130). Incidentally, the change of the upper limit at S130 is performed only when the processing shifts to S130 for the first time after determining at S110 that the driving support control is in execution. When the processing shifts to S130 during the execution of the driving support control, the upper limit of the threshold range changed at S130 to which the processing shifts for the first time is maintained. Furthermore, the change of the upper limit at S130 may be performed regarding all classes and all threshold regions in the first determination model and the second determination model. The upper limit in all classes and all threshold ranges in the first determination model and the second determination model may be changed at S130.

Figure 4:
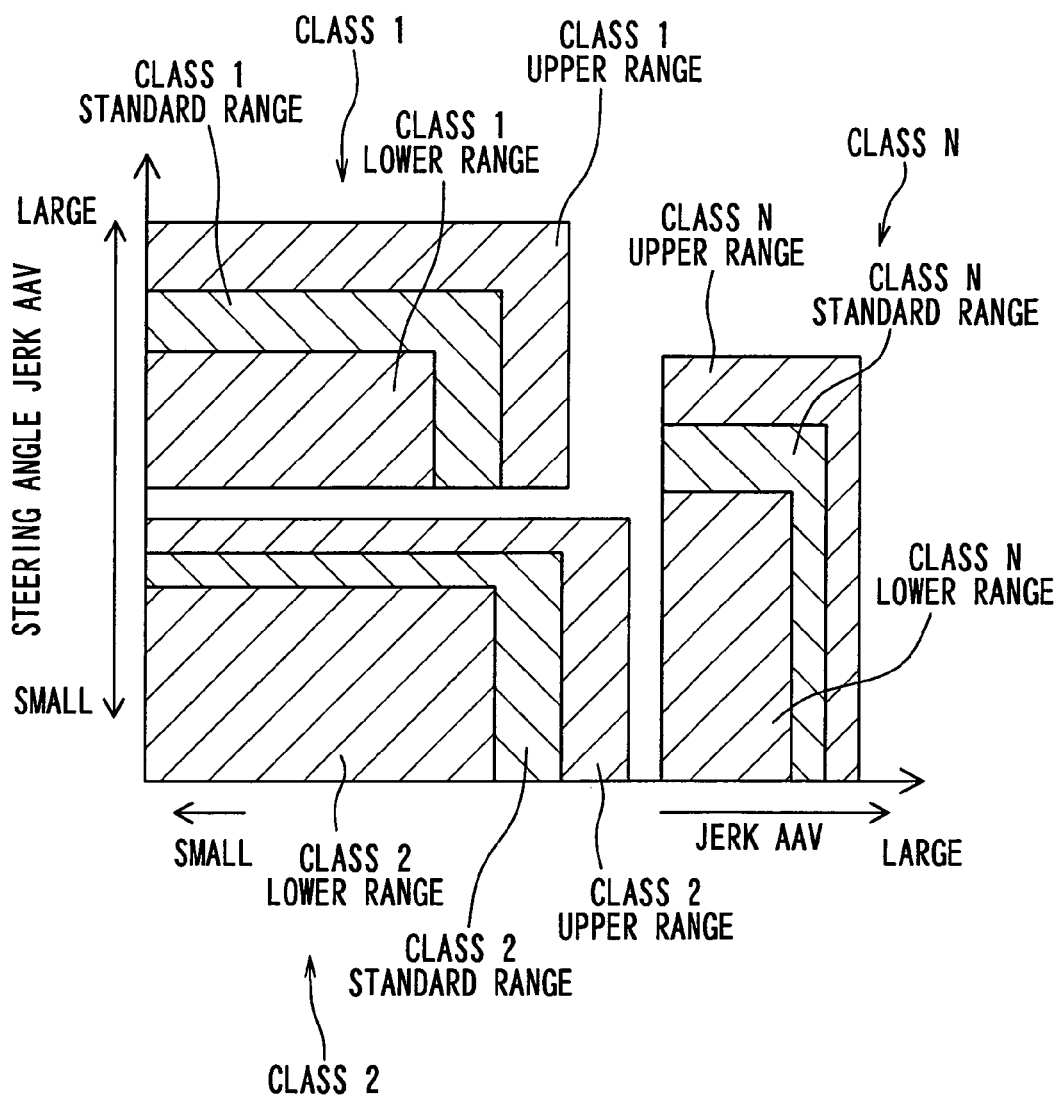
FIG. 4 is a diagram illustrating an example of a change of a threshold region.

At S130, as described in FIG. 4, the upper limit of the threshold region in all classes in the first determination model and the second determination model are decreased. For example, when the maximum value of the upper limit in the first determination model and the second determination model is set as the upper limit of each threshold region in the first determination model and the second determination model at S120, each upper limit of the threshold region in the first determination model and the second determination model may be changed to the standard value of the upper limit or the minimum value. When the standard value of the upper limit in the first determination model and the second determination model is set as the upper limit of the threshold region in the first determination model and the second determination model at S120, the upper limit of the threshold region in the first determination model and the second determination model may be changed to the minimum value.

At S140 in the status determination processing, the status determination ECU 10 determines whether a driving operation to the subject vehicle is performed or not. At S140, as a result of detection at the accelerator position sensor 7, when the amount of operation of the accelerator pedal exceeds a threshold, it is determined that an operation of the accelerator pedal, that is, a driving operation is performed. At S140, as a result of detection at the brake position sensor 9, when the amount of operation of the brake pedal exceeds a threshold, it is determined that an operation of the brake pedal, that is, the driving operation is performed. At S140, when a steering wheel is turned by more or equal to a predetermined angle, it is determined that the driving operation is performed.

The amount of operation of the accelerator pedal and the amount of operation of the brake pedal correspond to an example of actuation information. A rotation angle of the steering wheel corresponds to an example of steering information.

As a result of the determination at S140, when the driving operation to the subject vehicle is performed (S140: YES), the status determination ECU 10 determines that execution of the driving support control by the driving support ECU 30 is canceled, and the processing shifts the status determination processing to S150. At S150, the status determination ECU 10 returns the upper limit, which is changed at S130, of the threshold region in the first determination model and the second determination model to the upper limit designated by the user. That is, at S150, alleviation of the upper limit of the threshold region performed at S130 is cancelled. The status determination ECU 10 shifts the status determination processing to S170.

As a result of the determination at S140, when the driving operation to the subject vehicle is not performed (S140: NO), the status determination ECU 10 determines that the execution of the driving support control by the driving support ECU 30 is maintained, and the processing shifts the status determination processing to S160. At S160, the status determination ECU 10 maintains the upper limit, which is changed at S130, of the threshold region in the first determination model and the second determination model.

The status determination ECU 10 obtains a detection result of the sensor group 2, and stores the detection region in the RAM 14 (S170). The status determination ECU 10 determines whether the travelling speed of the subject vehicle measured with the vehicle speed sensor 5 is equal to or more than a predetermined speed threshold (S180). The predetermined speed threshold is a vehicle speed that is considered that the subject vehicle travels on a highway (an expressway). For example, the predetermined speed threshold may be equal to 50 km/h.

As a result of the determination at S180, when the travelling speed of the subject vehicle is less than the speed threshold (S180: NO), the status determination ECU 10 returns the status determination processing to S110. As a result of the determination at S180, when the travelling speed of the subject vehicle is equal to or more than the speed threshold (S180: YES), the status determination ECU 10 shifts the status determination processing to S190.

At S190, the status determination ECU 10 determines whether a period of time when the travelling speed of the subject vehicle maintains more or equal to the speed threshold after the travelling speed of the subject vehicle reaches the speed threshold or more passes the first time (for example, 15 minutes). The period of time when the travelling speed of the subject vehicle is maintained more or equal to the speed threshold after the travelling speed of the subject vehicle reaches the speed threshold or more may also be referred to as a speed maintain time. As a result of the determination at S190, when the speed maintain time passes the first time (S190: YES), the status determination ECU 10 shifts the status determination processing to S240.

As a result of the determination at S190, when the speed maintain time does not pass the first time (S190: NO), the status determination ECU 10 determines at S200 whether the speed maintain time passes the second time (for example, 8 minutes). As a result of the determination at S200, when the speed maintain time does not pass the second time (S200: NO), the status determination ECU 10 returns the status determination processing to S110.

As a result of the determination at S200, when the speed maintain time passes the second time (S200: YES), the status determination ECU 10 obtains the second determination model (S210). The second determination model obtained at S210 corresponds to the second determination model in which the upper limit of each threshold region is set at S120, S150, and S160.

The status determination ECU 10 calculates a second parameter based on the detection result stored in the RAM 4, the detection result being detected by the sensor group 2 (S220).

The second parameter corresponds to the jerk average absolute value, the steering angle change average absolute value, the steering angle jerk average absolute value in the specific short time, and the jerk average absolute value, the steering angle change average absolute value, and the steering angle jerk average absolute value in the second time.

In the status determination processing, the status determination ECU 10 collates the second parameter calculated at S220 with the second determination model obtained at S210 (S230). The status determination ECU 10 shifts the status determination processing to S270.

At S240 in the status determination processing, the status determination ECU 10 obtains the first determination model. The first determination model obtained at S240 is the first determination model in which the upper limit of each threshold region is set in S120, S150, and S160.

The status determination ECU 10 calculates a first parameter based on the detection result stored in the RAM 4, the detection result being detected by the sensor group 2 (S250).

The first parameter corresponds to the jerk average absolute value, the steering angle change average absolute value, the steering angle jerk average absolute value in the specific short time, and the jerk average absolute value, the steering angle change average absolute value, and the steering angle jerk average absolute value in the first time.

In the status determination processing, the status determination ECU 10 checks the first parameter calculated at S250 and the first determination model obtained at S240 (S260). The status determination ECU 10 shifts the status determination processing to S270.

At S270, it is determined whether all of the second parameters are included in either of the threshold regions of the second determination model as a result of the checking at S230, or all of the first parameters are included in either of the threshold regions of the first determination model as a result of the checking at S260. After the determination at S270, when it is determined that all second parameters are not included in either of the threshold regions of the second determination model, or all first parameters are not included in either of the threshold regions of the first determination model, the status determination ECU shifts the status determination processing to S280.

At S280, the status determination ECU 10 determines that the driver is in a non-absentminded drive. In the non-absentminded drive, the driver does not drive absentmindedly. The non-absentminded drive may also be referred to as an attentive driving. The status determination ECU 10 shifts the status determination processing to S110.

As a result of the determination at S270, when it is determined that all of the second parameters are included in either of the threshold regions of the second determination model, or all of the first parameters are included in either of the threshold regions of the first determination model, the status determination ECU shifts the status determination processing to S290.

At S290, the status determination ECU 10 determines that the driver drives absentmindedly (that is, the driver is in the absentminded drive). The status determination ECU 10 outputs a control signal to the informing device 20 so that the control signal notifies of the absentminded drive (S300). The informing device 20 receiving the control signal outputs a warning that indicate the absentminded drive is performed. Incidentally, content notified by the informing device 20 may be a suggestion that suggests taking of a rest, or may be a combination of the warning and the suggestion.

The status determination ECU 10 shifts the status determination processing to S110.

The status determination processing repeatedly calculates a parameter showing the vehicle behavior according to the detection result in the sensor group 2. As a result of the checking of the parameter and the determination model, when either of the threshold regions of the determination model includes the parameter, it is determined that the driver drives absentmindedly.

In the status determination processing, while the driving support control is in execution, the threshold regions of all of the determination models collating the parameter are changed, so that it is less likely to determine that the driver in the movable body drives absentmindedly as compared with a case where the driving support control is not performed. The status determination processing determines whether the parameter is included in either of the changed threshold region. In other words, it may be prevented from being determined that the driver in the movable body drives absentmindedly as compared with a case where the driving support control is not performed.

According to the status determination processing in the embodiment, when the driving support control is executed in the vehicle, it may be possible to prevent from being determined that a driver in the vehicle drives absentmindedly.

Therefore, according to the status determination processing, it may be possible to reduce an erroneous determination that the driver drives absentmindedly, despite that the driver does not drive absentmindedly when the driving support control is executed in the vehicle.

When the execution of the driving support control is cancelled, the status determination processing cancels the alleviation of the upper limit of the threshold region performed at S130. According to the cancellation of the alleviation, the threshold region is changed, so that it becomes likely to determine that a driver of a movable body drives absentmindedly as compared with a case where the driving support control is executed.

Therefore, according to the status determination apparatus in the present disclosure, it may be possible to secure a determination accuracy of a driver status when the driving support control is not executed.

That is, according to the status determination ECU 10, it may be possible to improve the determination accuracy of the driver status.

In the status determination processing, when the driving operation is performed to the vehicle, it is considered that the execution of the driving support control in the vehicle is cancelled. In the status determination processing, when a steering operation is performed, or when an actuation operation such as an operation to an accelerator pedal, an operation to a brake pedal, or the like, it is considered that the driving operation to the vehicle is performed.

According to the status determination apparatus, it may be possible to surely perform a cancellation of the alleviation of the upper limit of the threshold region performed at A130.

In the status determination apparatus, so that it may be prevented from being determined that the driver in the movable body drives absentmindedly as compared with a case where the driving support control is not executed, the upper limit is changed and all of the threshold regions in the determination model collating the parameter are changed.

Since the threshold region narrows by the changing of the upper limit, according to the status determination processing, it may be possible, when the driving support control is executed, to change the threshold region so as to be prevented from being determined that the driver in the vehicle drives absentmindedly with a simple manner.

Incidentally, the threshold region is determined for a property of each driver and at least a part of the threshold region is not overlapped with another threshold region.

According to the status determination ECU 10, when a specific driver performs an absentminded drive actually, it is possible to determine that the specific driver performs the absentminded drive. However, to a different driver, it is possible to reduce a case where the erroneous determination is performed and the absentminded drive is performed despite that the driver does not perform the absentminded drive.

According to the status determination ECU 10, it may be possible to reduce the erroneous determination caused from differences of behavior information by individual differences of drivers when a driver performs the absentminded drive.

Incidentally, the status determination electronic control apparatus 10 and S170 may correspond to a behavior acquisition portion. The status determination electronic control apparatus 10, S220, and S250 may correspond to a check portion. The status determination electronic control apparatus 10, S270, and S290 may correspond to a determination portion. The status determination electronic control apparatus 10, S110, and S130 may correspond to a range change portion.

Other Embodiment

It is noted that the present disclosure is not limited to the embodiment. The present disclosure may be performed in various modes within a scope of the disclosure.

For example, in the embodiment, the threshold region is determined by the short-term jerk region, the long-term jerk region, the short-term steering angle change region, the long-term steering angle change region, the short-term steering angle jerk region, and the long-term steering angle jerk region. The range of the behavior information defining the threshold region is not limited to the regions. The threshold region may be determined by at least one of the short-term jerk region, the long-term jerk region, the short-term steering angle change region, the long-term steering angle change region, the short-term steering angle jerk region, and the long-term steering angle jerk region. The threshold region may be added by a range of behavior information other than the jerk average absolute value, the steering angle change average absolute value, and the steering angle jerk average absolute value.

In the generation of the determination model, the k-means clustering is used as a data clustering method in the embodiment. A data clustering method is not limited to this example. The data clustering method may be a Ward method, or another method. Any kinds of method may be used as the data clustering method for generating the determination model as long as multiple data are classified into designated numbers of clusters.

A target mounting the status determination system 1 is a vehicle in the embodiment. The target mounting the status determination system is not limited to the vehicle. A target mounting the status determination system may be, for example, a motorcycle, a vehicle, an aircraft, a ship, a vessel, or the like. Any movable body may be a target to which the status determination system 1 is mounted.

The present disclosure may be provided as various modes such as a program performed by a computer that determines a driver status, a method determining a driver status, or the like, in addition to the status determination apparatus described in the embodiments.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A status determination apparatus determining a driver status in a movable body, the status determination apparatus comprising:
   a driving support controller that supports driving of the movable body, the driving support controller outputs an execution signal indicating a driving support control is in execution when the driving support controller executes the driving support control; and
   a processor configured to:
      obtain, by a behavior acquisition portion, behavior information as present behavior information, wherein the behavior information represents behavior of the movable body;
      collate, by a check portion, the present behavior information, which is obtained by the behavior acquisition portion, with a threshold region corresponding to a speed maintain time of at least two kinds of threshold regions each representing a different range of the behavior information at time when a driver in the movable body drives absentmindedly to check whether the threshold region includes the present behavior information, the speed maintain time representing a period of time when a travelling speed of the movable body is maintained to be equal or greater than a predetermined speed threshold;
      determine, by a determination portion, that the driver in the movable body drives absentmindedly when collation by the checking portions shows that the threshold region includes the present behavior information;
      determine, based on the execution signal from the driving support controller, whether the driving support controller executes the driving support control;
      change, by a range change portion the threshold region to an alleviated threshold region when the driving support controller is determined to execute the driving support control, causing the driver to be less likely to be determined as driving the movable body absentmindedly in comparison with the threshold region; and
      maintain, by the range change portion, the threshold region when the driving support controller is determined to not execute the driving support control,
   wherein:
      the check portion collates the present behavior information with the threshold region changed by the range change portion, when the range change portion changes the threshold region.

2. The status determination apparatus according to claim 1, wherein the processor is further configured to,
   when the driving support control is cancelled,
      change, by the range change portion, the threshold region, and
      be more likely to determine that the driver in the movable body drives absentmindedly in comparison with a case where the driving support control is executed.

3. The status determination apparatus according to claim 2, wherein:
   when a driving operation is performed to the movable body, the range change portion determines that the driving support control is cancelled.

4. The status determination apparatus according to claim 3, wherein:
   the range change portion obtains steering information that represents a steering operation to the movable body; and
   when the steering information indicates the steering operation is performed, the range change portion represents that the driving operation is performed to the movable body.

5. The status determination apparatus according to claim 3, wherein:
   the range change portion obtains actuation information that represent an actuation operation to the movable body; and when the actuation information represents the actuation operation is performed, the range change portion determines that the driving operation is performed to the movable body.

6. The status determination apparatus according to claim 1, wherein:
when the driving support control is performed,
the range change portion changes the threshold region by narrowing the range of the behavior information represented by the threshold region; and
the driver is prevented from being determined as driving absentmindedly.

7. The status determination apparatus according to claim 1, wherein:
at least two of threshold regions are determined for each property of the driver; and
at least a part of one of the at least two of the threshold regions is not overlapped with an other of the at least two of the threshold regions.

8. The status determination apparatus according to claim 1, wherein:
the movable body is a vehicle; and
the driving support control for the vehicle includes an adaptive cruise control and a lane keeping assistance in the vehicle.

9. The status determination apparatus according to claim 1, wherein
the processor is further configured to
output a control signal to an informing device to output a warning indicating absentminded driving, when the driver in the movable body is determined to drive absentmindedly.

10. The status determination apparatus according to claim 1, wherein
the threshold region is different from the alleviated threshold region,
the threshold region and the alleviated threshold region are modeled in a determination model which models behavior information of the moving body at the time the driver drives absentmindedly.

11. The status determination apparatus according to claim 10, wherein
in the determination model, the threshold region and the alleviated threshold region are each modeled for each behavior of a plurality of behaviors of the moving body.

12. The status determination apparatus according to claim 10, wherein
in the determination model, the threshold region and the alleviated threshold region are each modeled for at least two of: a short-term jerk region, a long-term jerk region, a short-term steering angle change region, a long-term steering angle change region, a short-term steering angle jerk region, and a long-term steering angle jerk region.

13. The status determination apparatus according to claim 10, wherein
in the determination model, the threshold region and the alleviated threshold region are each modeled with respect to a pre-determined short-term time and a pre-determined long-term time,
in the determination model, the pre-determined short-term time is a shorter time than the pre-determined long-term time.

14. The status determination apparatus according to claim 13, wherein
there are at least two of determination models including a first determination model and a second determination model,
the first determination model models behavior information at the time the moving body transits to steadily traveling,
the second determination model models behavior information at the time the moving body is steadily traveling,
the pre-determined long-term time of the second determination model which models behavior information at the time the moving body transits to steadily traveling is longer than the pre-determined long-term time of the first determination model which models behavior information at the time the moving body is steadily traveling,
the processor is further configured to
determine whether the vehicle is steadily traveling, and use one of the first determination model and the second determination model based on whether the moving body is determined to be steadily traveling.

15. The status determination apparatus according to claim 14, wherein
both of the pre-determined short-term time in the first determination model and the pre-determined short-term time in the second determination model are shorter than the pre-determined long-term time in the first determination model.

* * * * *